United States Patent Office 3,539,690
Patented Nov. 10, 1970

3,539,690
HYPOFLUORITE BACTERICIDE
Gary L. Gard, Beaverton, Oreg., and Arleen C. Pierce, New Brunswick, N.J., assignors to Allied Chemical Corporation, New York, N.Y., a corporation of New York
No Drawing. Filed Dec. 7, 1966, Ser. No. 599,742
Int. Cl. A01n 9/24
U.S. Cl. 424—298                                      6 Claims

ABSTRACT OF THE DISCLOSURE

A method of combating microorganisms by exposing them to perfluorinated hypofluorites of the formula $R_fOF$ wherein $R_f$ is a lower perfluoroalkyl radical, in vapor phase.

This invention relates to a method for combating microorganisms, especially bacteria, and, in a preferred embodiment to a method of combating microorganisms in vapor phase.

The problem of combating microorganisms, meaning in the context of this discussion killing and preventing or retarding the propagation of microorganisms, is common to a number of industries, such as the food, agricultural and pharmaceutical industry and is particularly significant to the medical profession. The usual methods of sterilization such as steam heat, chemical solution, radiation and the like are impractical when large areas such as hospital rooms, laboratories, and animal quarters are desired to be sterilized or when it is desired to sterilize laboratory and medical equipment which may contain plastics, fabrics and the like and may be adversely effected by moisture and heat.

The term sterilization is generally interpreted as referring to a condition in which a body or locus is free from substantially all living microorganisms as opposed to being free from certain microorganisms.

The problem of freeing a body from substantially all living microorganisms is no mean one because, although many varieties of microorganisms are relatively easy to combat, others have particularly high resistance to adverse conditions and are exceedingly difficult to combat. Such a microorganism is the bacteria *Staphylococcus aureus*. Unfortunately, such bacteria are commonly found in hospitals and food and are responsible for a large number of human fatalities every year. Because *Staphylococcus aureus* cells are so difficult to combat in comparison with other microorganisms, researchers have used these cells as standards for sterilization tests. It is presumed that if a given chemical agent is effective in combating *Staphylococcus aureus* cells, it will be effective in combating other varieties of vegetative cells. The converse of this is, of course, not true. Experience has proved this to be the case. An illustrative standard test that is widely used is the so-called F.D.A. (Food and Drug Administration) method as published by Ruehle and Brewer in 1931 (see Porter, Bacterial Chemistry and Physiology, John Wiley and Sons, Inc., N.Y. (1946), p. 226). This method requires tests of disinfectant or antiseptic action to be carried out against strains of *Staphylococcus aureus*.

The problem of sterilizing large areas of heat or water sensitive materials has been alleviated by the use of antimicrobic agents in vapor phase. Effective vapor phase antimicrobic agents must be capable of being readily introduced in the vicinity of the area to be treated, of rapidly and thoroughly penetrating porous surfaces in the area; of effectively penetrating while in vapor phase the microorganisms to be treated; of destroying the microorganisms over a wide range of temperatures and humidities; and permitting ready removal by aeration. Unfortunately, many chemical agents while possessing good antimicrobic activities are incapable of functioning effectively in vapor phase for lack of one or more of the above noted requirements. Bactericidal agents, for example, which have high vapor pressures and may be vaporized easily may still not possess the penetratability property requirement for effecting vapor phase use.

It is a major object of this invention to provide a novel method for combating microorganisms such as bacteria, fungi and the like.

It is another object of the invention to provide a novel method for effectively combating microorganisms such as bacteria, fungi and the like over a wide range of relative humidity conditions.

Yet another object is to provide a novel sterilization method.

It is a more particular object of the invention to provide a novel method for combating bacteria.

A still more specific object of the invention is to provide a novel method for combating *Staphylococcus aureus* cells.

A preferred object of the invention is to provide a novel method for combating microorganisms particularly bacteria in vapor phase.

The preferred most specific object of the invention is to provide a novel method for combating *Staphylococcus aureus* cells in vapor phase.

It has been found that the above stated objects of the invention are accomplished by treating microorganisms, particularly *Staphylococcus aureus* cells, with perfluorinated hypofluorites of the general structure $R_fOF$ wherein $R_f$ represents short carbon chain fluorinated units. A preferred composition of perfluorinated hypofluorites of the general structure $R_fOF$ is trifluoromethylhypofluorite, $CF_3OF$, in which $R_f$ represents $CF_3$. Said composition has been found to exhibit extremely high activity in both high and low humidities.

The novel antimicrobic agents of the invention are referred to hereinbefore and will be referred to hereinafter as "the perfluorinated hypofluorites."

The perfluorinated hypofluorites are a known class of compounds. The perfluorinated hypofluorite, in which $R_f$ represents $CF_3$, is commercially available from Peninsular Chemical Research Incorporated, Gainesville, Fla., and is a colorless gas having a boiling point of $-95°$ C. at atmospheric pressure.

Illustrative, but not restrictive, of the short carbon chain fluorinated units within the scope of the invention are the following: $CF_3$, $(CF_3)_2CF$, $(CF_3)_3C$, $CF_3CF_2$, $CF_3CF_2CF_2$. Detailed information as to the preparation and characterization of these short chain fluorinated units may be found in "Preparation and Characterization of New Fluoroxy Compounds," Prager and Thompson, Journal of the American Chemical Society, Jan. 20, 1965, pp. 230–238. In each of the above illustrations of the short carbon chain fluorinated units within the scope of the invention, the overall perfluorinated hypofluorite represented by the formula $R_fOF$ is suitable for combating microorganisms since the reactive portion of the microorganism is the OF bond.

The perfluorinated hypofluorites may be used to treat microorganisms by contacting the microorganisms to be treated, or surfaces containing the same, with the perfluorinated hypofluorite in the form of a solution, mist, spray, dust or in accordance with the preferred embodiment in various states. The perfluorinated hypofluorite may be used alone or in admixture with vaporous, solid or liquid diluents such as air and water or hydrocarbon liquids, with or without any of the well-known anionic, cationic or nonionic surface-active wetting agents. Such agents include, for example, alkali metal salts or higher fatty acids, water-soluble salts of sulfated higher fatty alcohols, water-soluble aryl sulfonates, and quaternary ammonium bases such as trialkyl, benzyl, and ammonium chloride. In the preferred vapor phase embodiment, a perfluorinated hypofluorite may be conveniently employed such as by vaporizing it in a closed area in which the microorganism-containing surfaces to be treated are located or by using a vaporous diluent such as air which may be bubbled into the liquid perfluorinated hypofluorite and then the liquid perfluorinated hypofluorite-laden air used to fumigate a closed space surrounding the microorganism-containing surfaces to be treated.

As is well known in this art, dosages of a given antimicrobic agent can vary widely depending upon a particular organism to be controlled, the area of the locus to be treated, the time in which control is desired to be established and environmental conditions such as temperature, relative humidity, etc. In any event, sufficient concentration of the perfluorinated hypofluorite should be utilized in order to effectively combat the microorganisms to be treated; that is to say in order to maximize the killing of existing bacteria and the prevention of propagation of the same in the same locus for a significant period of time. The dosages that will be required in a particular case to accomplish these ends are readily ascertainable and are thus within the skill of the art.

The perfluorinated hypofluorites can be employed as the sole effective ingredient in combating microorganisms; however, if desired, they can be combined with active ingredients such as other antimicrobic agents or growth inhibitors to achieve special results or with known active components such as perfumes, propellant aids and the like.

EXAMPLE

Circular patches of cotton cloth, each having an area of about 2 cm.$^2$ and each impregnated with an aqueous suspension of about $5 \times 10^6$ *Staphylococcus aureus* cells and subsequently dried, were suspended by wires about halfway down into each of several one-liter flasks. Trifluoromethylhypofluorite ($CF_3OF$) was then injected into each flask by means of a short burst from a gas cylinder containing the trifluoromethylhypofluorite. The flasks were then stoppered and the patches containing the bacteria were thus exposed to the trifluoromethylhypofluorite at relative humidities of 45% and 90% at room temperature (73° F.) for periods of 1, 4 and 24 hours. Relative humidities in the bottles were elevated by flushing with air passed through water. At the end of the exposure periods the patches were removed and assayed for viable organisms by the pour-plate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monooleate) v./v. and adjusted to pH 7 with 1 N NaOH. Organisms remaining on the patches were dislodged by shaking and aliquots were plated in enriched nutrient agar. After incubating for 48 hours at 37° C., the percentage of organisms killed (attributable to the trifluoromethylhypofluorite test material) was calculated by comparison of the number found after testing with an assay of unexposed contaminant patches. Bacteria counts were made with a Quebec Colony counter. The average results of the above-described tests are shown in the following table:

TABLE I

| | Percent bacteria kill | |
|---|---|---|
| | 45% R.H. | 90% R.H. |
| Exposure, hrs.: | | |
| 1 | 86.92 | 99.99 |
| 4 | 99.31 | 100.00 |
| 24 | 99.90 | 100.00 |

As can be seen from the results set forth in Table I, trifluoromethylfluorite, $CF_3OF$, was highly effective after only one hour of exposure with the microorganisms treated and virtually completely effective after 4 hours of treatment both at high and low relative humidities.

In a similar manner $(CF_3)_2CFOF$ or $(CF_3)_3C$ or any of the other short carbon chain fluorinated units mentioned previously under the formula $R_fOF$, injected into the flask described in the example above and then exposed to the patches containing the bacteria also described in the example produce equivalent bacteria kill to that discussed and shown in Table I. In the case of those short carbon chain fluorinated units which are in the liquid state, doses of between 0.1 and 0.5 cc. of the liquid is injected into the bottom of the flask (as compared to injection of gas described in the example) and then the procedure to determine bacteria kill continues as described in that example.

We claim:
1. A method of combating bacteria which comprises applying to said bacteria a bactericidal amount of a perfluorinated hypofluorite of the formula $R_fOF$, wherein $R_f$ represents short carbon chain fluorinated units selected from the group consisting of $CF_3$, $(CF_3)_2CF$, $(CF_3)_3C$, $CF_3CF_2$, and $CF_3CF_2CF_2$.
2. The method of claim 1 in which $R_f$ is representative of $CF_3$.
3. The method of claim 1 in which the perfluorinated hypofluorite is employed in vapor phase.
4. The method of claim 2 in which the perfluorinated hypofluorite is employed in vapor phase.
5. The method of claim 1 in which the bacteria are *Staphylococcus aureus* cells.
6. The method of claim 5 in which $R_f$ represents $CF_3$ employed in vapor phase.

References Cited

UNITED STATES PATENTS 2,689,254  9/1954  Cady et al. _____ 260—694
2,904,601  9/1959  Ilgenfritz _____ 167—39

OTHER REFERENCES

Chandler et al., "Journal of the Am. Pharm. Assn.," vol. XLVI, No. 2, February 1957, pp. 124–128.

ALBERT T. MEYERS, Primary Examiner
V. D. TURNER, Assistant Examiner

U.S. Cl. X.R.
424—167